Dec. 29, 1936.  R. S. SANFORD ET AL  2,066,077
BRAKE
Filed Feb. 20, 1933  3 Sheets-Sheet 1

INVENTORS.
ROY S. SANFORD
FRANK L. O. WADSWORTH
BY
C. H. Fowler
ATTORNEY.

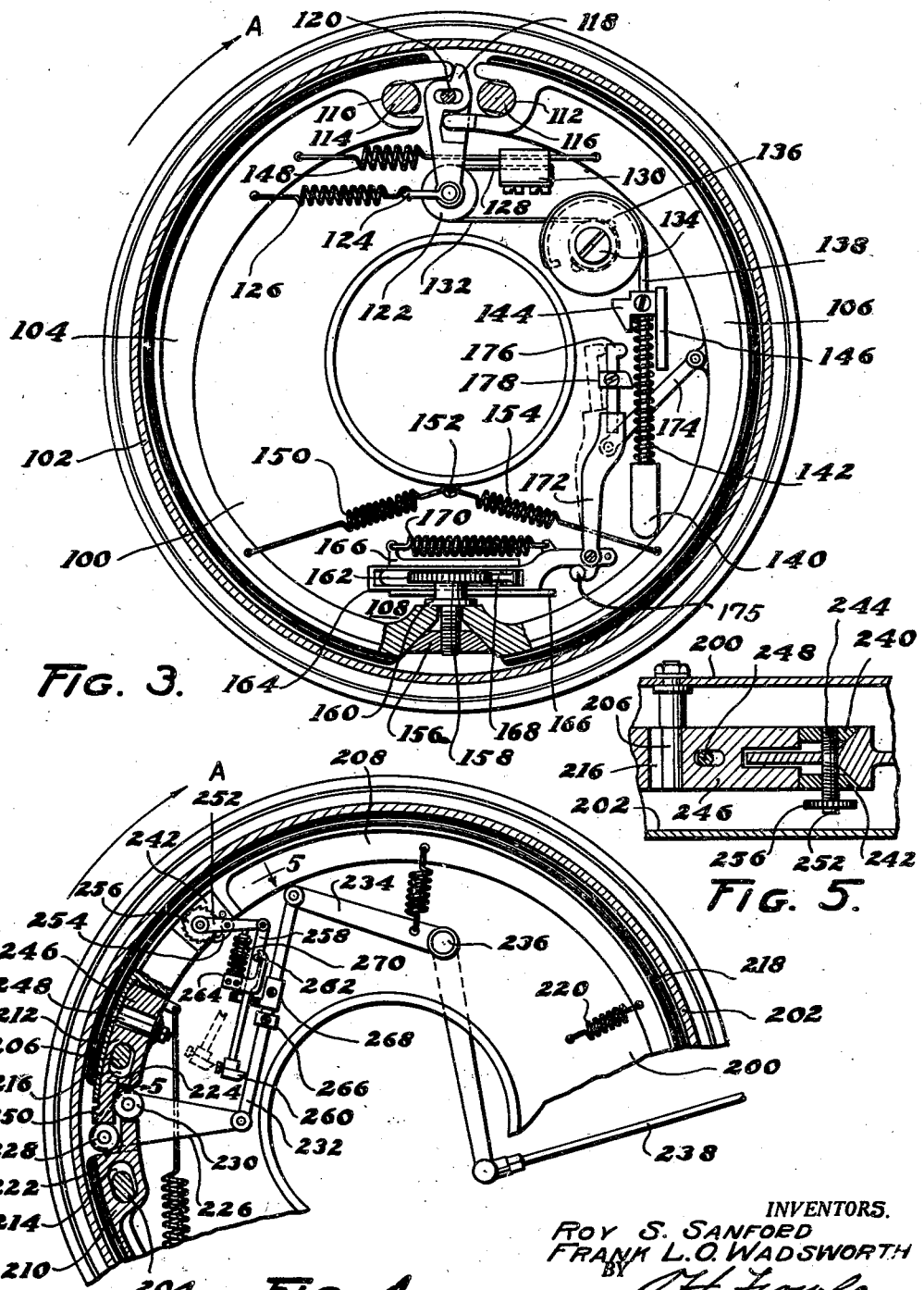

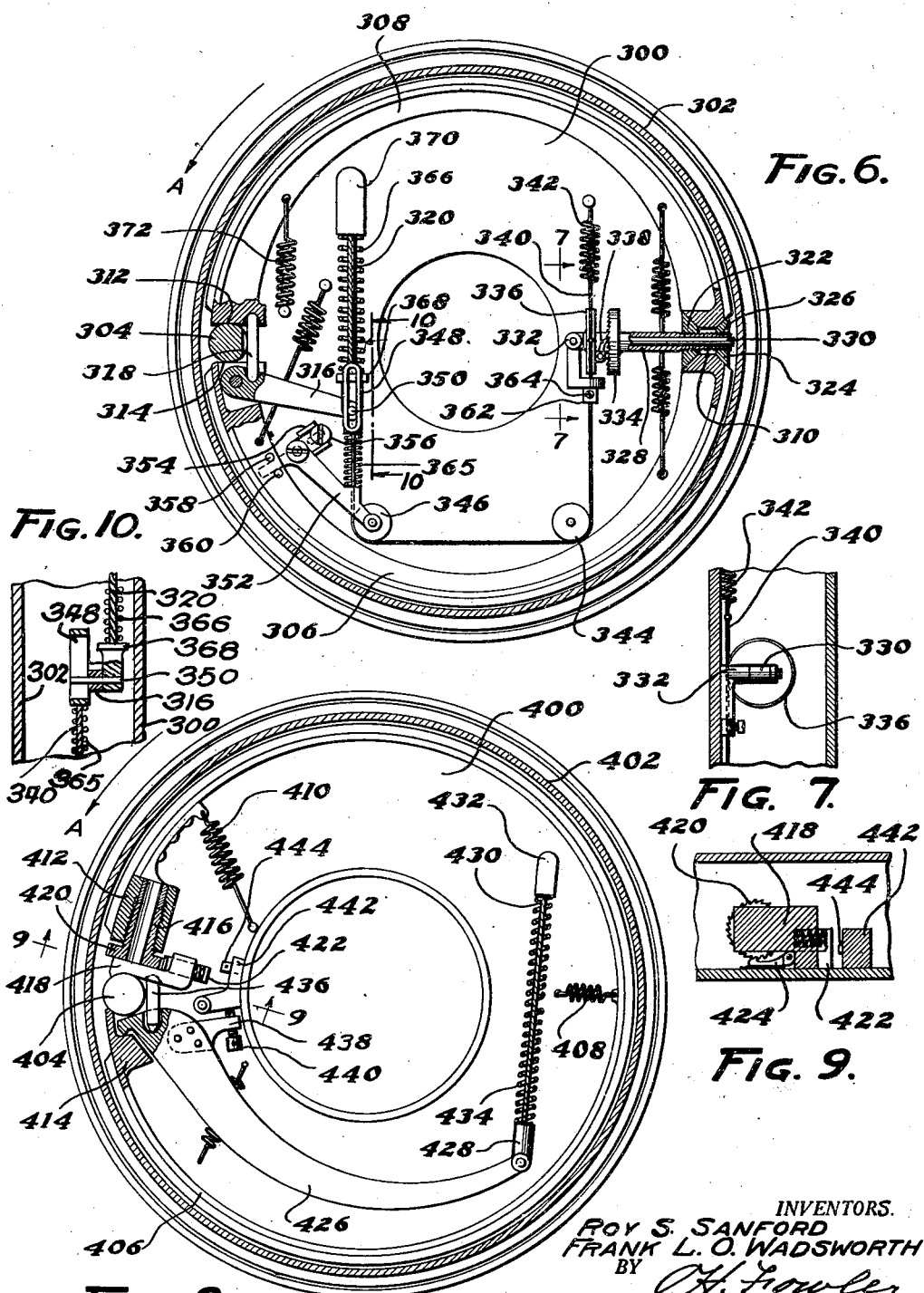

Patented Dec. 29, 1936

2,066,077

UNITED STATES PATENT OFFICE 2,066,077

BRAKE

Roy S. Sanford, South Bend, Ind., and Frank L. O. Wadsworth, East Liberty, Pa., assignors to Bendix Aviation Corporation, South Bend, Ind., a corporation of Delaware Application February 20, 1933, Serial No. 657,692

23 Claims. (Cl. 188—79.5)

This invention relates to brakes and more particularly to internal expanding brakes.

Heretofore various devices have been devised for automatically adjusting the friction element of a brake to compensate for wear of the lining. These devices have not been satisfactory, because the maximum amount of adjustment is effected when the drum of the brake is expanded by the heat generated by severe or long continued braking; and when the adjustment is effected under such conditions subsequent contraction of the brake drum, due to the cooling thereof causes binding or dragging between the surface of the drum and the brake shoes. The present invention aims to overcome this objection by an automatic adjusting device which is normally operable only on reverse braking.

In the several embodiments herein illustrated a backing or face plate has associated therewith a rotatable drum and a friction device mounted on the backing plate for cooperation with a brake drum. The friction device comprises a floating ring or band which is made up of two adjustably connected members and which is arranged to anchor at one end when the drum is turning in one direction and at the other end when the drum is turning in the reverse direction.

The ends of the band or friction element are moved apart by a floating cam or other actuating means operated by a cable or linkage, and the movements of the friction element or of the operating means, in reverse braking, is utilized to operate an adjusting means for the friction elements.

One object of the invention is to provide a simple and efficient means for automatically adjusting the brake shoes or brake band as the brake lining wears, so as to maintain a substantially constant clearance between the brake drum and the shoes, when the brake is off and thus eliminate the necessity for any manual adjustment of the parts during the life of the lining.

Another object of the invention is to provide an automatic adjusting device for the friction elements of a brake normally operable only on reverse braking, but which may also become temporarily operable on forward braking if the wear or clearance is, for any reason abnormally increased in the intervals between two successive reverse braking operations.

A further object of the invention is to provide means for adjusting the friction elements of a brake which may be operated either by the movement of the shoes or brake band, or by motion of the cable, or actuating means for effecting this movement.

Other objects of the invention will appear from the following description taken in connection with the drawings, which form part of this specification, and in which:

Figure 3 is a vertical sectional view of another form of brake mechanism embodying the invention;

Figure 4 is a similar view of a third embodiment of the invention;

Figure 5 is a cross section on the line 5—5, Figure 4;

Figure 6 illustrates an application of the invention to a front wheel brake;

Figure 7 is a side elevation of a part of the construction as seen on the line 7—7, Figure 6;

Figure 8 is a vertical sectional elevation of a fifth embodiment of the invention;

Figure 9 is a sectional view on line 9—9, Figure 8; and

Figure 10 is a partial section on the line 10—10 of Figure 6.

Figure 1:
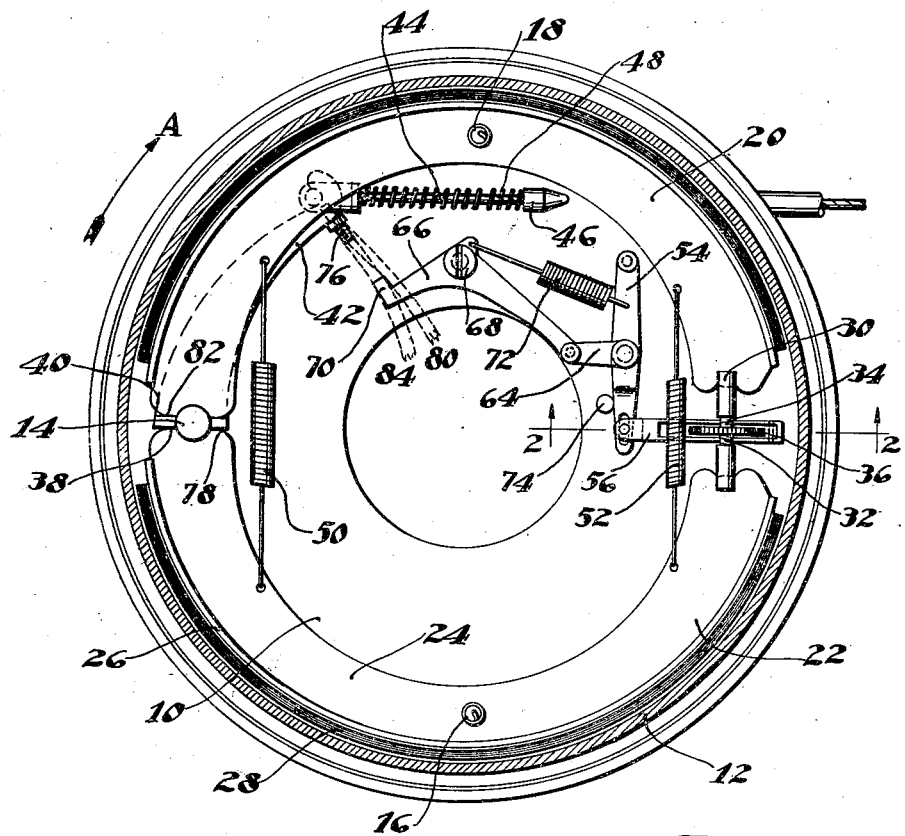
Figure 1 is a vertical sectional view of a brake of the two shoe type, looking toward the inner face of the backing plate and illustrating the friction elements and the adjusting means therefor in side elevation.
Figure 2:
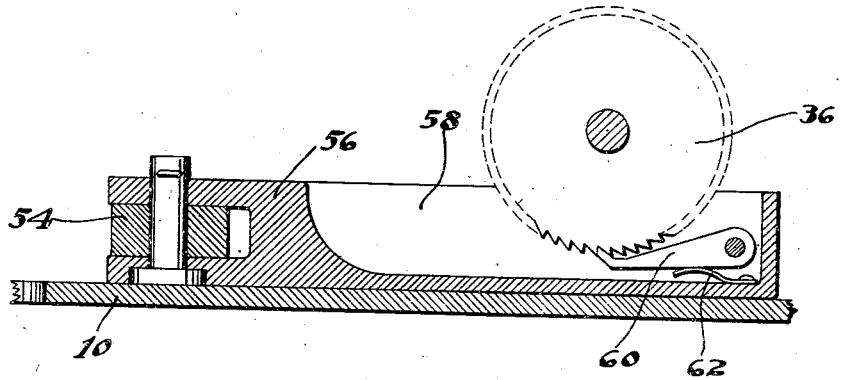
Figure 2 is an enlarged detail view substantially on line 2—2, Figure 1.

Referring to the embodiment of the invention shown in Figures 1 and 2, 10 represents a fixed support such as a backing plate. The backing plate has associated therewith a rotatable drum 12 which may be secured to a wheel, not shown, and positioned on the backing plate is an anchor 14 and suitable steady rests 16 and 18.

Positioned for movement on the backing plate 10 is a friction element including a primary shoe 20 and a secondary shoe 22 supported by the steady rests. The shoes are of the conventional type each comprising a web 24 supporting a rim 26 to which is secured a suitable lining 28 adaptable for cooperation with the braking surface of the drum.

The articulated ends of the shoes 20 and 22 are connected by a suitable adjusting device 30 comprising a member including right and left hand threads 32 and 34 and a ratchet wheel 36. The opposite ends of the shoes have shoulders 38 and 40 notched to engage the anchor 14; and loosely pivoted on the anchor, between the shoulders 38 and 40 is a floating cam lever 42 connected to and operable through a tension member or draft cable 44, extending through a conduit abutment 46, on the backing plate 10 to a suitable power operating means. A compression spring 48 is interposed between the abutment 46 and the cable connection to the cam lever 42 for the purpose of assisting the return movement of the cable when the operating tension therein is relieved. The shoes 20 and 22 are connected by springs 50 and 52 which also serve to return the friction elements to the off position and to maintain them in proper spaced relation, or clearance with respect to the brake drum when the brake is released.

Pivoted on the backing plate 10 is a lever 54 pivotally connected at one end to a bar 56 slidable radially on the backing plate. The bar 56 is provided with a longitudinal slot or groove 58 receiving the ratchet wheel 36 on the adjusting member, and pivotally secured in the slot is a pawl 60 urged into engagement with the ratchet wheel 36 by a spring 62.

The intermediate portion of the lever 54 is pivotally connected by a link 64 to one end of a lever 66 pivotally mounted on the backing plate at 68 and provided at its opposite end with a projecting lug 70. The levers 54 and 66 are connected by a strong tension spring 72 normally imposing sufficient pull on the lever 54 to hold it against a stop 74, in which position there is no relative movement between the pawl 60 on the bar 56 and the ratchet wheel 36 on the adjusting member.

The cam lever 42 carries an adjustable stud 76 adapted to engage the lug 70 on the lever 66 when the brakes are applied in reverse braking, and to impose sufficient pressure thereon to actuate the lever 54. Movement of the lever 54 slides the bar 56 radially outward, and during this movement the pawl 60 rides over the teeth of the ratchet wheel 36, without imparting any motion thereto. When the brake is released the spring 72 returns the parts to their normal positions, and as the bar 56 moves radially inward the pawl 58 engages and rotates the ratchet wheel 36 to effect the desired adjustment of the friction elements.

In operation—assuming that the drum is revolving in a clockwise direction when the car is moving forward—the primary shoe 20 upon engaging the drum is moved in the direction of the arrow A. This movement is imparted to the secondary shoe 22 through the adjusting member 30, and results in holding the heel end of this shoe against the anchor 14. In this operation, the cam lever 42 moves about its point of contact with the shoe 22 at point 78 and the end of the adjustable stud 76 travels in the circular path indicated by the dotted lines 80. This path of movement is to the right or inside of the lug 70 on the lever 66, and under normal conditions of clearance there is, therefore, no actuation of the adjusting device in forward braking.

When the drum is rotating counterclockwise the shoe 22 moves away from the anchor and the shoe 20 is held against the anchor. In this operation, which is reverse braking, the cam lever pivots on the center 82, and the end of the stud 76 moves in the curved path 84, and when the initial clearance has been increased by a small amount of wear this movement is sufficient to bring the stud into engagement with the lug 70, and thereby rock the levers 66 and 54 by an amount which is proportional to the wear. This rocking movement slides the bar 56 radially outward by a corresponding amount. When the brake is released friction on the screws 32 and 34 is reduced, due to the removal of the load, and the spring 72 then returns the parts to their normal positions thereby causing the pawl 60 to engage and rotate the ratchet wheel and the right and left threaded members 32 and 34, to effectively readjust the length of the friction element by the requisite amount and reestablish the initial clearance between the brake drum and the lining on the friction element.

By adjusting the stud 76 the amount of spreading or "take up" movement effected by each reverse braking operation may be accurately predetermined and controlled, so as to hold the variation in clearance due to wear or other causes within any desired limits.

It will be noted that the effective length or "leverage" of the cam lever 42 is less in forward braking (when the lever is rotating about the fulcrum point 78) than it is in reverse braking (when it rocks on the fulcrum 82); and that as a consequence of this the arcuate movement of this lever is also less in forward braking than in reverse braking. This difference in arcuate movement would normally prevent the stud 76 from engaging with the lug 70 even if the paths 80 and 84 were coincident. But if an excessive or unusual clearance should at any time be established between the normal automatic readjustments at each reverse braking operation, the resultant abnormal movement of the cam lever in forward braking would bring the stud 76 into engagement with the body of the lever 66, (inside of the terminal lug 70), and thus serve to take up a portion of this excess clearance before the next complete readjustment is effected by the succeeding reverse braking operation. The amount of such temporary or "emergency" readjustment may in all cases be controlled and limited by varying the length or offset of the lug 70 from the body of the lever. This will prevent the taking up of such a large amount of temporary clearance or lost motion as might result from excessive thermal expansion, and thus result in a binding or dragging of the parts when the brake drum cools down.

Another embodiment of the invention is illustrated in Figure 3. In this embodiment a backing plate 100 associated with a rotatable drum 102 has positioned thereon a pair of brake shoes 104 and 106. The shoes have their articulated ends connected by an adjusting device shown generally at 108, and the other ends of the shoes have notched shoulders 110 and 112 engaging spaced anchors 114 and 116.

A floating operating cam lever 118 is positioned on a pivot pin 120 on the backing plate between the anchors 114 and 116, in thrust engagement with the shoulders 110 and 112. The force applying end of the lever 118 is bifurcated. An axle is supported by the bifurcations and journalled on the axle between the bifurcations is a pulley 122. A yoke 124 is supported by the axle and the yoke is connected by a suitable spring 126 to the shoe 104. This pulley has its periphery connected by a ribbon 128 to a fixed support 130 on the backing plate, and the periphery of the pulley 122 is further connected by a ribbon 132 to the hub 134 of a pulley 136, positioned for rotation on the backing plate. Connected to the periphery of the pulley 136 is an operating or draft cable 138 extending through a conduit abutment 140 on the backing plate to a power operating means, not shown. A compression spring 142 is wound on the cable between the conduit abutment 140 and a dog 144 adjustably positioned on the cable. As shown, the dog is adapted to slide on a suitable guide 146 on the backing plate.

The shoes 104 and 106 are connected by a return spring 148. The shoe 104 is connected by an auxiliary return spring 150 to a fixed support 152 on the backing plate, and the shoe 106 is connected by an auxiliary return spring 154 to the fixed support 152. These springs assist in returning the shoes to the off position and in retaining the shoes when in this position in proper spaced relation to the drum.

The adjusting device 108 includes a wedge 156 movable between the articulated ends of the shoes by a screw 158 having a flange 160 engaging the shoes and a ratchet wheel 162. A bar 164 slidable on the backing plate between suitable guides 166 is slotted to receive the ratchet wheel and positioned on the bar in the slot is a spring pressed pawl 168 engaging the ratchet wheel. The bar 164 is attached to the guide 166 by a tension spring 170 and pivotally connected to the bar 164 is a lever 172. This lever is connected by a link 174 to the shoe 106, and the free end of the lever 172 is provided with a projection lug 176 and an adjustable collar 178 for cooperation with the dog 144 on the operating or draft cable.

In operation when the drum 102 is revolving in the direction of the arrow A (forward braking) the shoe 106 is moved away from the anchor 116 and the link 174 acts on the lever 172 to rock it from the full line position to the dotted line position. This movement carries the projection lug 176 out of the path of the action of the adjustable dog 144 and the normal operating movement of the cable (which in this instance is substantially greater in forward braking than in reverse braking) does not affect the position of the slidable bar 164.

When the drum is revolving in the opposite direction the shoe 104 moves away from the anchor 114, and the shoe 106 is held in engagement with the anchor 116, thereby maintaining the fulcrum link 174 and the lever 172 in full line position and retaining the lug 176 in the path of action of the dog 144.

Under these circumstances any excess movement of the operating or draft cable, which may result from additional clearance due to wear of the lining, will bring the lug and dog elements in operative engagement and will rock the lever 172 on its pivotal connection with the fulcrum link 174, thereby sliding the bar 164 to the right. In this movement the pawl will ride on the teeth of the ratchet wheel.

When the brake is released the spring 170 will return the parts to the full line position against a suitable stop 175, and in this return movement the pawl 168 will engage the ratchet wheel and turn the adjusting screw 158 by a predetermined amount, which is just sufficient to take up the wear of the friction lining and restore the usual clearance between the drum and the friction element. The amount of wear which may be permitted between two successive automatic adjustments may be controlled and regulated by the setting of the dog on the operating or draft cable.

If for any reason the amount of clearance is abnormally increased between the two successive reverse braking adjustments a temporary or emergency adjustment sufficient to maintain a pedal reserve for an excessive expansion, may be effected by a forward braking operation through the medium of the collar 178 which may be so set that it will be engaged by the dog on the cable when the cable movement exceeds that required for normally setting the brakes in such an operation. The amount of such an emergency adjustment can be controlled by the setting of the collar so that the take up effected at such times is never sufficient to cause the brakes to drag when the heated and expanded drum returns to normal size.

Another embodiment of the invention is illustrated in Figures 4 and 5. In this embodiment a backing plate 200 has associated therewith a rotatable drum 202. Spaced anchors 204 and 206 are arranged on the backing plate and movably positioned on the backing plate is a friction element comprising a split band 208 having reinforced separable ends 210 and 212 provided with openings 214 and 216 for the reception of the anchors 204 and 206 respectively. The band has suitably secured thereto a friction lining 218 adaptable for cooperating with the braking surface of the drum, and the band is retained when the brake is in the off position, in proper spaced relation to the drum by a plurality of springs 220 connected between the band and fixed supports on the backing plate.

The separable ends of the band are shouldered as indicated at 222 and 224. These shoulders support an operating cam lever 226. As shown, the lever has arranged thereon spaced rollers 228 and 230 positioned on the shoulders 222 and 224 respectively. The force applying end of the lever is connected by a link 232 to one end of a bell crank lever 234 pivoted on the backing plate at its knee 236. The other end of the bell crank lever is connected to a rod 238 extending to an operating means, not shown.

In this structure adjustment of the length of the band is effected by two axially movable wedge-shaped members 240 and 242 connected by a screw 244 and interposed between the reinforced ends of the ring or band and a circumferentially movable block 246 held in operative engagement therewith by radial bolts and spring washers 248. The block 246 is provided with a circumferential slot which receives the primary anchor 206, and with a terminal lug 250 engaging the roller 228 on the actuating cam.

One end of the screw 244 carries a lever 252 provided with a reverse pawl 254 adapted to engage the teeth of a ratchet wheel 256 and rotate the wheel in a counterclockwise direction to move the wedge-shaped members 240 and 242 to effect circumferential movement of the block 246 and adjust the over-all length of the band.

The free end of the lever 252 is connected to a reciprocable bar 258 which carries, at its outer extremity, an adjustable lug 260 and it is provided at an intermediate point in its length, with a pin 262 which engages a bracket 264 on the backing plate. The link 232 carries an adjustable collar 266 adapted to engage, at times, with the head of the lug 260, and a second adjustable member 268 provided with a slotted arm embracing the sides of the bar 258, and adapted to engage at other times, with the stem of the member 260.

*Mode of operation.*—When the brake is applied to stop forward movement of the car, the drum is rotating in the direction of the arrow A, the block 246 and the primary end of the ring or band is moved away from the anchor 206 and in this movement the engagement of the pin 262 with the bracket 264 rocks the bar 258 to the left or away from the link 232 and carries the lug 260 out of line of action of the collar 266 on the link 232, so that the normal range of operative movement of the particular elements 226 and 232 will not actuate the adjusting mechanism.

However, when the car is moving backward, the application of the brakes will keep the brake ring or band elements in anchored engagement with the anchor 206 and the parts 258 and 260 will remain in the full line position, and under these circumstances any excess movement of the actuating link 232—which in this case is greater in reverse—will cause the collar 266 to engage the head of the lug 260 and rock the pawl lever 252 in a clockwise direction by an amount dependent upon and proportional to the excess movement.

When the brake is released a compression spring 270 interposed between the bracket 264 and the lever 252 will return the parts 252 and 258 to their neutral positions; and in this return movement the pawl will engage the ratchet wheel and move the wedge-shaped blocks toward each other, thereby lengthening the brake ring or band sufficiently to take up any increase clearance due to the wear of the brake lining since the last automatic adjustment.

If in the interval—between successive reverse braking adjustments—the clearance between the brake drum and brake ring becomes so excessive as to loose the desired pedal serve, an emergency adjustment sufficient to take care of a temporary thermal expansion may be effected during the operation of forward braking, by setting the member 268 in such position that any substantial excess movement of the link 232 will bring this member into engagement with the lug 260 after the collar 266 has passed under the head of the lug, and thereby move the pawl lever to a proportional degree. The amount of temporary adjustment thus effected can be limited to any extent desired, so as to avoid danger of dragging of the friction surfaces.

Another embodiment of the invention is illustrated in Figures 6, 7 and 10. In this embodiment a backing plate 300 has associated therewith a rotatable drum 302. The backing plate has thereon an anchor 304, and a friction element adaptable for cooperation with the drum. As shown, the friction element comprises corresponding shoes 306 and 308 connected at their articulated ends by an adjusting device 310, and the separable ends of the shoes have shoulders 312 and 314 adaptable for engagement with the anchor.

The separable end of the primary shoe 306 has pivoted thereto an operating lever 316 connected as by a rod 318 to the separable end of the secondary shoe 308, and the force applying end of the operating lever 316 has attached thereto a drag cable 320 extending through the backing plate to a suitable power operating means.

The structure shown is adaptable to a front wheel brake in which a considerable part of the drum chamber is occupied by the king pin mounting. The take up adjustment for the two shoes 306 and 308 comprises two oppositely disposed wedges 322 and 324 interposed between the articulated ends of the shoes and concurrently movable toward each other by a right and left hand screw 326 on a hollow tubular member 328. This member revolves freely on an elongated stud shaft 330 pivotally supported on a bracket 332 secured to the backing plate, and the tubular member has thereon a ratchet wheel 334. A drum 336 is positioned for rotation on the shaft 330. The drum carries a pawl 338 adapted to engage with the teeth of the ratchet wheel.

A fine wire cable 340 is connected at one end to a tension spring 342 attached to the backing plate. This wire passes once around the drum 336 and leads therefrom through an eye in the bracket and around a pair of guide pulleys 344 and 346 to a slotted fork 348 embracing a pin 350 in the force applying end of the operating lever 316.

The guide pulley 346 is mounted on the long arm of a bell crank lever 352 pivotally supported on a slotted bracket 354 which may be clamped in the desired position on the backing plate by a cap screw 356; and the short end of the lever is loosely engaged by two pins 358 and 360 carried by the web of the primary shoe 306. The effective length of the cable 340 between the bracket 332 and the fork 348 may be adjusted by a sliding collar 362 which may be secured at any desired point on the cable by a set screw 364. The cable 340 passes through a coil spring 365 interposed between the bell crank lever 352 and the fork 348. The drag cable 320, passes through a coil spring 366 interposed between a clevis 368 connecting the drag cable to the operating lever and an abutment 370 on the backing plate.

Mode of operation. When the vehicle is moving forwardly the brake drum is revolving in the direction of the arrow A, and when the brake is applied by pulling the drag cable 320, the toe end of the primary shoe is moved away from the anchor pin 304 by counterclockwise rotation of the operating lever 316 about its fulcrum, and the heel of the secondary shoe is held in engagement with anchor, both by the pull of a spring 372 connecting the primary shoe to the backing plate and which is stronger than a companion spring 372 connecting the secondary shoe to the backing plate, and also by the wiping action of the revolving drum.

The counterclockwise movement of the primary shoe rotates the lever 352 in the same direction, and thus shortens the distance between the guide pulleys. This permits the slotted fork 348 to move upwardly, under the thrust of the compression spring 365 between the bell crank lever 352 and the fork, and carries the outer terminus of the slot beyond to the normal range of movement of the associated pin in the force applying end of the operating lever.

Under these conditions there will be no pull exerted on the cable 340, and therefore, no movement of the pawl drum 336. In the operation of reverse braking the primary shoe will be held in anchored engagement by the reverse rotation of the brake drum and the bell crank lever 352 will therefore be locked in the full line position. Under such conditions the rotation of the operating lever which rocks on its fulcrum will bring the pin in the end of that lever into engagement with the upper end of the slotted member 348 and will rotate the pawl drum by an amount that can be controlled and regulated by the adjustment of the collar 362.

When the brake is released, the drum 336 will be returned to its original position by the pull of the spring 342 and in this return movement the ratchet wheel and the screw 326 will be revolved thereby spreading the shoes by the amount requisite to compensate for a predetermined degree of wear of the brake lining.

If it is desired to provide for an emergency adjustment that will prevent a loss of pedal reserve—when the brake drum has been subjected to an excessive heating on forward braking—the bracket 354 is moved radially inward so as to increase the length of the short arm of the bell crank lever and correspondingly reduce the movement of the guide pulleys. This will hold the slotted member 348 in such position that the excess movement of the operating lever—which may result from abnormal drum expansion—will bring its terminal pin into engagement with this member and thereby effect a slight rotation of the pawl drum. The resultant adjustment of the shoes is however so limited in amount that it will not cause dragging of the brakes when the drums are again cooled to normal temperature.

A further modification of the invention is illustrated in Figures 8 and 9. As shown the invention is applied to a single anchor full wrapping band brake. In this embodiment a fixed support 400 has associated therewith a rotatable drum 402. The support has positioned thereon an anchor 404 and a friction element adaptable for cooperation with the drum including a split band 406 secured to the backing plate as by suitable return springs 408 and 410, and provided on its separable ends with reinforced shoulders 412 and 414 adaptable for engagement with the anchor. As shown, a hollow screw 416 is threaded into the reinforced shoulder 412 on the secondary end of the band. The screw 416 engages an L shaped member 418 interposed between the screw 416 and the anchor. The screw 416 is provided with a toothed head 420 and the member 418 is slotted at one side to receive a reciprocable bar 422. This bar carries a reverse pawl 424 adapted to engage the teeth on the head 420.

An operating lever 426 has one end positioned between the shoulder 414 on the primary end of the band and the anchor 404. The other end of the operating lever has attached thereto a clevis 428 to which is secured a drag cable 430 passing through an abutment 432 on the backing plate to a power operating means, not shown. The cable has thereon a coil spring 434 interposed between the clevis and abutment.

The operating lever is connected by a bar 436 to the member 418 and the lever is provided with a bracket 438 which carries an adjusting screw 440 adapted to engage an L shaped lever 442 having one leg pivoted on the backing plate and its other leg provided with an adjusting member 444.

In operation the brakes are applied by pulling on the cable 430 and thereby rocking the operating lever 426 in a counterclockwise direction. The cable pull tends to rotate the entire brake ring or band in a counterclockwise direction about the axes of the brake drum, and if the drum is moving in the direction of the arrow A (which corresponds to a forward movement of the car) the toe end of the band will be moved away from the anchor while the heel end together with the member 418 is held in pressure engagement therewith. The accompanying movement of the operating lever will cause the end of the screw 440 to engage the lever 442 and rock it in a counterclockwise direction; but this action will not normally affect the adjustment elements because the path of movement of the adjusting member 444 is to one side of the pawl bar 422. However, when the car is moving backwardly and the brakes are applied the primary end of the band is held against the anchor by the reverse rotation of the drum and the heel or secondary end of the band together with the member 418 are carried as a unit away from the anchor; and the inner end of the pawl bar 422 is thus brought into line with the adjusting member 444. The rocking of the lever 442 by movement of the operating lever, now effects an outward movement of the pawl bar 422 which is controllable in amount by the adjustment of either or both of the members 440 and 444.

When the brakes are released, the pawl bar 422 is returned to its neutral position by a suitable compression spring and the adjusting screw 416 is rotated sufficiently to compensate for a predetermined amount of brake lining wear.

If desired a limited and controllable amount of emergency adjustment can also be effected in forward braking by so setting the screw 440 that any excess or abnormal movement of the operating lever 426 will bring the intermediate part of the lever 442 into engagement with the lower end of the pawl bar 422, and produce a slight outward movement thereof; but this emergency adjustment should never be sufficient in amount to result in a dragging of the friction surfaces when the brake drum assumes its normal diameter. Or stated in another way the emergency adjustment should expand the brake ring by something less than the normal clearance between the friction surfaces when the brakes are in the off position.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. A brake comprising friction elements, an adjusting device connecting the friction elements including a pinion, a slidable member having a longitudinal slot receiving the pinion, a spring-pressed pawl carried by the member engaging the pinion, a lever pivotally connected to the member, means for actuating the friction elements including a tension member moved differently in forward and in reverse braking, and means actuated by the tension member for transmitting force to said lever only on reverse braking.

2. A brake comprising friction elements, an adjusting device connecting the friction elements including a pinion, a slidable member having a longitudinal slot receiving the pinion, a spring-pressed pawl in the slot engaging the pinion, a lever pivoted to the slidable member, a stop for limiting the movement of the lever, an operating cam for the friction elements, a cable connected to the cam and moved differently in forward and in reverse braking and a device operably connecting the cable to the lever only on reverse braking.

3. A brake comprising friction elements having applying means including a part moved differently in forward and in reverse braking, means for automatically adjusting the elements operatable by operative engagement with said part when so moved in reverse braking and means for effecting emergency adjustment of the elements on forward braking.

4. A brake comprising friction elements having applying means including a part moved differently in forward and in reverse braking, means for automatically effecting normal adjustment of the elements by operative engagement with said part when so moved in reverse braking, and means for effecting emergency adjustment of the elements on forward braking.

5. A brake comprising friction elements having applying means including a part moved differently in forward and in reverse braking, means for automatically adjusting the elements only by operative engagement with said part when so moved in reverse braking, and emergency means for adjusting the friction elements operable only on forward braking.

6. A brake comprising friction elements having associated therewith a part moved further in reverse braking than in forward braking, means for automatically effecting normal adjustment of the friction elements operatable only by engagement with said part in reverse braking, and emergency means for adjusting the elements operatable only by engagement with said part when moved excessively in forward braking.

7. A brake comprising automatic means for adjusting the friction elements of the brake including separable parts relatively movable in intersecting paths when braking in the reverse direction and in paths which do not normally intersect when braking in the forward direction and which operate said means when they engage each other.

8. A brake comprising friction elements, actuating means movable with the friction elements during reverse braking only, an adjusting device including a pinion connecting the friction elements, a slidable member having a longitudinal slot receiving the pinion, means normally separated from the actuating means and engaged thereby during reverse braking only to move the slidable member, and a spring-pressed pawl in the slot engaging the pinion.

9. A brake comprising friction elements, an adjusting device including a pinion connecting the friction elements, a slidable member having a longitudinal slot receiving the pinion, a spring-pressed pawl in the slot engaging the pinion, a part moved differently in forward and in reverse braking, and a lever operably connected to the slidable member and positioned to be actuated by said part when moved in reverse braking.

10. In a vehicle brake having friction elements, automatic means for adjusting the friction elements including normally separated parts relatively movable in intersecting paths when braking in the reverse direction and in paths which do not normally intersect when braking in the forward direction and which operate said means when they engage each other, and means to permit said parts to engage when braking in the forward direction when a predetermined adjustment is required.

11. In a vehicle brake comprising friction elements, an adjusting device connecting the friction elements including a wedge positioned between adjacent ends of the friction elements, a pinion having teeth said pinion being operably connected to the wedge, a slidable member having a longitudinal slot receiving the pinion, a spring-pressed pawl in the slot engaging the pinion, a part moved differently in forward and in reverse braking, a lever operably connected to the slidable member and separated from but positioned to be actuated by said part when moved in reverse braking to permit the pawl to engage with a different tooth of the pinion, and yielding means to restore the slidable member to its former position when the brakes are released to increase the length of the friction elements.

12. In a brake mechanism, a stationary member, friction means adapted to engage the stationary member, operating mechanism movable with the friction means when braking in the reverse direction only, automatic adjusting means for the friction means positioned in the line of movement of the operating mechanism when moved with the friction means in reverse braking.

13. In a brake mechanism, a stationary member, friction means adapted to engage the stationary member, operating mechanism movable with the friction means when braking in the reverse direction only, automatic adjusting means including a pinion having right and left-hand threads engaging spaced wedges for increasing the length of the friction means and positioned in the line of movement of the operating mechanism when moved with the friction means in reverse braking.

14. A brake mechanism having friction means including a plurality of friction elements, adjusting means including a pinion having right and left-hand threads for varying the effective length of the friction means, a movable member having a pawl yieldingly urged into contact with the pinion, yielding means urging the movable member toward one extreme position, means including a linkage to shift the movable member, means to apply the brakes including an actuating member operable differently in forward and reverse braking, and a stop member positioned to be engaged by said linkage.

15. In a brake mechanism, friction means, adjusting means including a pinion having right and left-hand threads for varying the effective length of the friction means, a movable member having a pawl yieldingly urged into contact with the pinion, yielding means urging the movable member toward one extreme position, means including a linkage to shift the movable member, said yielding means being connected to the linkage, means to apply the brakes including an actuating member operable differently in forward and reverse braking, and an adjustable stop member carried by a part of the mechanism and arranged at times to engage said linkage.

16. In a vehicle brake, a stationary backing plate, a rotatable brake drum, friction means adapted to engage the drum, adjusting means including a pinion having right and left-hand threads for changing the effective length of the friction means, a ratchet wheel fixed to the pinion, a movable member having a pawl adapted to engage the ratchet wheel, means including a linkage to shift the movable member, yielding means urging the movable member to one extreme position, means including a cam moved differently in forward and reverse braking for urging the friction means into contact with the drum, an adjustable member fixed to the cam and adapted to engage the linkage when moved in one manner of movement of the cam to urge the friction means into contact with the drum and to avoid engaging said linkage when moved in the other manner of movement of said cam.

17. A brake mechanism having a stationary backing plate, a rotatable brake drum, friction means adapted to engage the drum, adjusting means including a pinion having right and left-hand threads for changing the effective length of the friction means, a ratchet wheel fixed to the pinion, a movable member having a pawl adapted to engage the ratchet wheel, means including a linkage to shift the movable member, yielding means carried by the linkage urging the movable member to one extreme position, means including a cam moved differently in forward and reverse braking for urging the friction means into contact with the drum, an adjustable member fixed to the cam and adapted to engage said linkage when moved to urge the friction means into contact with the drum in reverse braking and to avoid engaging said linkage when moved to apply the brakes in forward braking.

18. A brake comprising friction elements which are shiftable to anchor at one end in forward braking and the other end in reverse braking, and automatic adjusting means for said friction elements said means having parts controlled by the shifting of the shoes whereby said means adjusts the friction elements to normal clearance only when they are applied in reverse braking and to greater than normal clearance when applied in forward braking.

19. A brake comprising friction elements which are shiftable to anchor at one end in forward braking and the other end in reverse braking, applying means for said friction elements, an adjustment for said friction elements operated by excessive movement of said applying means, means controlled by the shifting of said friction elements interconnected with said adjustment so that the excessive movement of said applying means necessary to operate said adjustment is materially greater in forward braking than in reverse braking.

20. A brake comprising friction elements which have one movement when applied in forward braking and a different movement in reverse braking, applying means for said friction elements, an adjustment for said friction elements, actuating means for said adjustment operated by excessive movement of said applying means, and means controlled by the movements of the friction elements and interconnected with said actuating means to shift it so that the excessive movement of said applying means necessary to operate said adjustment is materially greater in forward braking than in reverse braking.

21. A brake comprising friction elements which have one movement when applied in forward braking and a different movement in reverse braking, applying means for the friction elements, an automatic adjustment for the friction elements having an actuating member positioned for forward and reverse braking in accordance with the movement of said elements, and means operated by the applying means adapted to operatively engage said member and actuate the adjustment and arranged so that greater applying movement is necessary to engage said member when it is positioned for forward braking than when it is positioned for reverse braking.

22. A brake comprising an anchor, a friction element anchoring thereon in forward braking and moving away from the anchor in reverse braking, and means controlled by movement of the friction element away from the anchor for automatically operating an adjusting means only on reverse braking and which includes parts actuatable in an emergency for operating an adjusting means only on forward braking.

23. A brake comprising a friction element having a part which has one movement in forward braking and a different and greater movement in reverse braking, means for adjusting the element, and means controlled by the reverse-braking movement of said part of the element for actuating the adjusting means only on reverse braking and which includes parts operable in an emergency for actuating the adjusting means only on forward braking.

ROY S. SANFORD.
FRANK L. O. WADSWORTH.